US012586863B2

(12) United States Patent
Shin et al.

(10) Patent No.: US 12,586,863 B2
(45) Date of Patent: *Mar. 24, 2026

(54) BATTERY PACK WITH IMPROVED GAS VENTING PATH

(71) Applicant: LG ENERGY SOLUTION, LTD., Seoul (KR)

(72) Inventors: Ju-Hwan Shin, Daejeon (KR); Tae-Kyeong Lee, Daejeon (KR); Dong-Hyun Kim, Daejeon (KR); Hyoung-Suk Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 516 days.

This patent is subject to a terminal disclaimer.

(21) Appl. No.: 18/025,546

(22) PCT Filed: Apr. 27, 2022

(86) PCT No.: PCT/KR2022/005992

§ 371 (c)(1),
(2) Date: Mar. 9, 2023

(87) PCT Pub. No.: WO2022/270746

PCT Pub. Date: Dec. 29, 2022

(65) Prior Publication Data

US 2023/0327278 A1 Oct. 12, 2023

(30) Foreign Application Priority Data

Jun. 21, 2021 (KR) ........................ 10-2021-0080408

(51) Int. Cl.
H01M 50/367 (2021.01)
H01M 50/211 (2021.01)
H01M 50/342 (2021.01)

(52) U.S. Cl.
CPC ....... *H01M 50/367* (2021.01); *H01M 50/211* (2021.01); *H01M 50/3425* (2021.01)

(58) Field of Classification Search
CPC ............. H01M 10/613; H01M 10/625; H01M 2200/10; H01M 2200/20; H01M 2220/20;
(Continued)

(56) References Cited

U.S. PATENT DOCUMENTS 9,159,970 B2 * 10/2015 Watanabe ........... H01M 10/613
2005/0170238 A1 8/2005 Abu-Isa et al.
(Continued)

FOREIGN PATENT DOCUMENTS

CN 208422978 U 1/2019
CN 209401710 U 9/2019
(Continued)

OTHER PUBLICATIONS

English Machine Translation: CN 209401710.*
(Continued)

*Primary Examiner* — Holly Rickman
*Assistant Examiner* — Linda N Chau
(74) *Attorney, Agent, or Firm* — Birch, Stewart, Kolasch & Birch, LLP

(57) ABSTRACT

A battery pack includes a plurality of battery modules, each including battery cells, a module housing accommodating the battery cells and a gas venting channel in communication with an inside of the module housing; and a pack case accommodating the plurality of battery modules, the pack case including a top plate to cover upper parts of the plurality of battery modules, the top plate having a venting port, wherein the gas venting channel of each battery module is in communication with the venting port.

17 Claims, 16 Drawing Sheets

(58) Field of Classification Search
 CPC ............. H01M 50/204; H01M 50/209; H01M
  50/211; H01M 50/224; H01M 50/249;
  H01M 50/271; H01M 50/30; H01M
  50/308; H01M 50/342; H01M 50/3425;
  H01M 50/358; H01M 50/367; H01M
  50/375; H01M 50/394
 See application file for complete search history.

(56) References Cited

U.S. PATENT DOCUMENTS

| | | |
|---|---|---|
| 2012/0015218 A1 | 1/2012 | Lee |
| 2013/0071706 A1 | 3/2013 | Lee |
| 2014/0113167 A1 | 4/2014 | Itoi et al. |
| 2016/0233471 A1* | 8/2016 | Khandelwal ........ H01M 50/224 |
| 2018/0261872 A1 | 9/2018 | Satoh |
| 2018/0358593 A1 | 12/2018 | Seo et al. |
| 2020/0152941 A1 | 5/2020 | Wynn et al. |
| 2020/0303701 A1 | 9/2020 | Kim et al. |
| 2021/0226295 A1 | 7/2021 | Kwon et al. |
| 2022/0271388 A1 | 8/2022 | Choi et al. |

FOREIGN PATENT DOCUMENTS

| | | |
|---|---|---|
| CN | 111933882 A | 11/2020 |
| CN | 112086605 A | 12/2020 |
| DE | 10 2013 200 440 A1 | 7/2014 |
| DE | 10 2018 202 947 A1 | 8/2019 |
| EP | 4 181 301 A1 | 5/2023 |
| JP | 2011-70871 A | 4/2011 |
| JP | 2011-70872 A | 4/2011 |
| JP | 2011-204577 A | 10/2011 |
| JP | 5440790 B2 | 3/2014 |
| JP | 2014-107178 A | 6/2014 |
| JP | 5673978 B2 | 2/2015 |
| JP | 5803553 B2 | 11/2015 |
| JP | 5939307 B2 | 6/2016 |
| JP | 2018-73560 A | 5/2018 |
| KR | 10-1191657 B1 | 10/2012 |
| KR | 10-1269721 B1 | 5/2013 |
| KR | 10-1282473 B1 | 7/2013 |
| KR | 10-2018-0006150 A | 1/2018 |
| KR | 10-1831817 B1 | 2/2018 |
| KR | 10-2019-0122474 A | 10/2019 |
| KR | 10-2152886 B1 | 9/2020 |
| KR | 10-2021-0046339 A | 4/2021 |
| WO | WO 2021/091058 A1 | 5/2021 |

OTHER PUBLICATIONS

International Search Report for PCT/KR2022/005992 (PCT/ISA/210) mailed on Aug. 18, 2022.
Extended European Search Report for European Application No. 22828595.3, dated Mar. 13, 2024.

* cited by examiner

BATTERY PACK WITH IMPROVED GAS VENTING PATH

TECHNICAL FIELD

The present disclosure relates to a battery pack, and more particularly, to a battery pack having a gas venting path for allowing venting gas to flow out of a pack case safely and efficiently when gas is generated from a battery module.

The present application claims the benefit of Korean Patent Application No. 10-2021-0080408 filed on Jun. 21, 2021 with the Korean Intellectual Property Office, the disclosure of which is incorporated herein by reference in its entirety.

BACKGROUND ART

Secondary batteries are attracting the attention as a new eco-friendly and energy efficient source of energy for their advantages such as remarkably reducing the use of fossil fuels and not generating by-products from the use of energy.

Accordingly, secondary batteries are increasingly used in a wide range of device applications. For example, secondary batteries are widely used as not only an energy source of multifunctional small products such as wireless mobile device or wearable device, but also an energy source of electric vehicles and hybrid electric vehicles suggested as an alternative to gasoline vehicles and diesel vehicles or energy storage systems (ESSs).

Lithium secondary batteries widely used in recent years have the operating voltage of about 2.5V to 4.5V for an individual lithium secondary battery. Accordingly, electric vehicles or energy storage systems requiring high capacity and high output use battery packs as their energy source, and a battery pack includes battery modules connected in series and/or in parallel, each battery module including lithium secondary batteries connected in series and/or in parallel.

Depending on the output or capacity of the battery packs required for electric vehicles, the number of lithium secondary batteries in a battery module may increase or the number of battery modules in a battery pack may increase.

However, as the battery pack includes a larger number of lithium secondary batteries, more serious damage occurs in the event of fires and explosion.

For example, when an event occurs in any battery module such as a short between lithium secondary batteries or an abnormal temperature rise, a large amount of venting gas may occur in the lithium secondary batteries, and when degradation is aggravated, in addition to the venting gas, high temperature spark including electrode active materials and aluminum particles may flare up. In this instance, the venting gas and the high temperature spark causes thermal damage to the adjacent battery module, and there is a very high risk that an additional event may occur to the other battery modules.

Accordingly, there is a need for the development of a gas venting path for allowing venting gas to flow out of the battery pack quickly and safely while minimizing the influence on other battery modules in the event of venting gas and high temperature spark in any battery module.

DISCLOSURE

Technical Problem

The present disclosure is designed to solve the above-described problem, and therefore the present disclosure is directed to providing a battery pack with a gas venting path for minimizing the influence on other battery modules in the event of venting gas or spark in any battery module.

The technical problem of the present disclosure to be solved is not limited to the above-described problem, and these and other problems will be clearly understood by those skilled in the art from the following detailed description.

Technical Solution

According to the present disclosure, there is provided a battery pack including a plurality of battery modules, each of the plurality of battery modules including battery cells, a module housing accommodating the battery cells, a gas venting channel in communication with an inside of the module housing; and a pack case accommodating the plurality of battery modules, the pack case including a top plate to cover upper parts of the plurality of battery modules, the top plate having at least one venting port, wherein the gas venting channel is in communication with the at least one venting port.

The at least one venting port may include a rupturable membrane which ruptures at a predetermined pressure or above.

The gas venting channel may be disposed on the plurality of module housings, and may include a duct of a hollow structure; at least one gas inlet provided on a first side of the duct; and a gas outlet provided on a second side of the duct at a predetermined distance from the gas inlet in an extension direction of the duct.

The at least one gas inlet may align with a first opening of each module housing and the gas outlet may align with the at least one venting port of the top plate, and the at least one venting port may include a rupturable membrane which ruptures at a predetermined pressure or above.

The at least one venting port may include a plurality of the venting ports, and each of the plurality of venting ports may be vertically connected to the gas outlet of the gas venting channel.

The top plate may be formed in a hollow structure and may include a lower plate facing an upper surface of the gas venting channel; and an upper plate opposite to the lower plate with an empty space therebetween, and the at least one venting port may include a first venting port in the lower plate, the first venting port vertically connected to the gas outlet of the gas venting channel; and a second venting port in the upper plate at a predetermined distance apart from the first venting port in a horizontal direction.

The rupturable membrane may be in a first of the first venting port and the second venting port, and a mesh may be in a second of the first venting port and the second venting port.

The battery pack may further include an outer cover plate configured to surround an upper area of the top plate.

The duct may include a plurality of partitions to partition an internal space.

The duct may include a plurality of narrow passages extended in a lengthwise direction between the plurality of partitions.

The battery cells may include first group battery cells and second group battery cells that are disposed to face each other with a firewall interposed therebetween configured to partition an internal space of the module housing.

The first opening may include a first first opening on a left top side of the module housing and a second first opening on a right top side of the module housing with respect to the firewall, and the gas inlet may include a first gas inlet which matches the first first opening and a second gas inlet which matches the second first opening.

The gas outlet may include a first gas outlet in a left edge area of the duct and a second gas outlet in a right edge area of the duct.

The first opening may be closed with a cap made of a hot melt material.

The module housing and the gas venting channel may be integrally formed.

According to another aspect of the present disclosure, there is provided a vehicle including the battery pack.

The gas venting channel is disposed on the plurality of module housings, and the gas venting channel may have a barrier dividing the gas channel into two parts, each part of the gas venting channel having a gas inlet and a gas outlet.

The top plate may have an interior empty space between a upper plate and a lower plate, and the at least one venting port may be a first venting port in communication with each of the gas outlets of the gas venting channel and a second venting port in the upper plate.

The battery pack may have a mesh in each of the first venting ports.

Advantageous Effects

According to an aspect of the present disclosure, it is possible to provide a battery pack having a gas venting path for allowing venting gas to flow out of the pack case quickly and safely without affecting other battery modules when venting gas or spark is generated from any battery module.

The effect of the present disclosure is not limited to the above-described effects, and these and other effects will be clearly understood by those skilled in the art from the present disclosure and the accompanying drawings.

DESCRIPTION OF DRAWINGS

FIG. 3 is a conceptual diagram of a gas venting path of the battery pack of FIG. 1.

FIG. 8 is a bottom view of a gas venting channel of FIG. 5.

FIG. 10 is a diagram showing a first opening of a module housing according to an embodiment of the present disclosure.

FIG. 11 is a diagram showing a communication structure between a module housing and a gas venting channel according to an embodiment of the present disclosure.

BEST MODE

Figure 1:
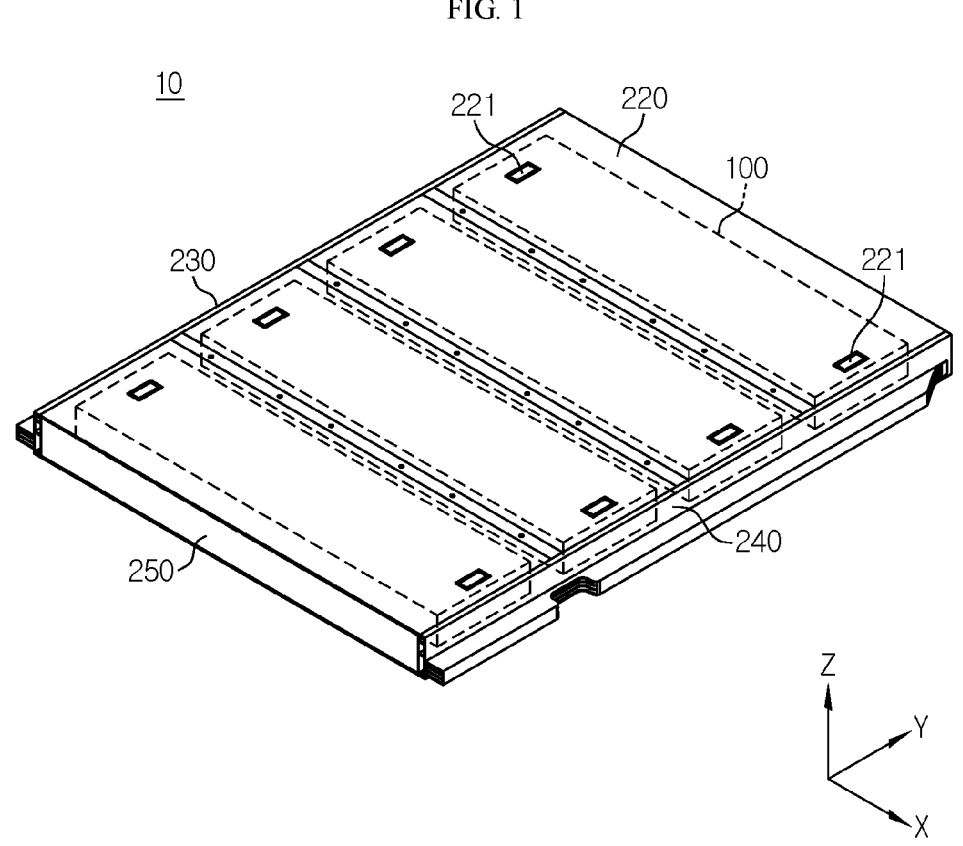
FIG. 1 is a schematic perspective view of a battery pack according to an embodiment of the present disclosure.

Hereinafter, the exemplary embodiment of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation. Therefore, the embodiments described herein and the illustrations shown in the drawings are just an exemplary embodiment of the present disclosure, but not intended to fully describe the technical aspects of the present disclosure, so it should be understood that a variety of other equivalents and modifications could have been made thereto at the time that the application was filed.

The terms top plate and base plate are used herein to define the main parts of a pack case, but when the battery pack is for example flipped upside down, it is obvious that the top plate corresponds to the bottom of the battery pack and the base plate corresponds to the top of the battery pack. That is, it should be noted that the top plate and the base plate may be interpreted differently from the dictionary meaning depending on the placement of the battery pack or the position of an observer.

Figure 2:
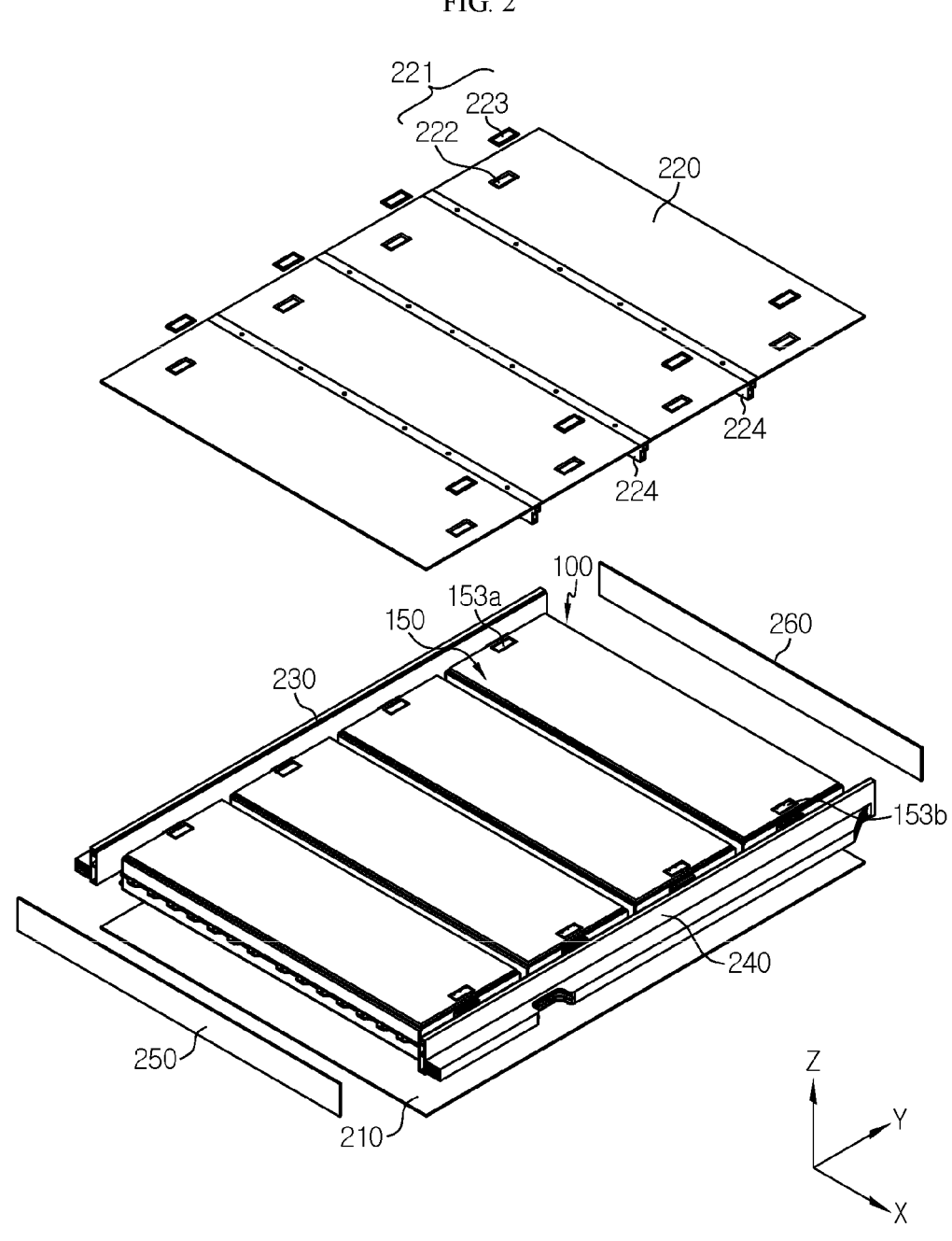
FIG. 2 is a partial exploded perspective view of the battery pack of FIG. 1.
Figure 3:
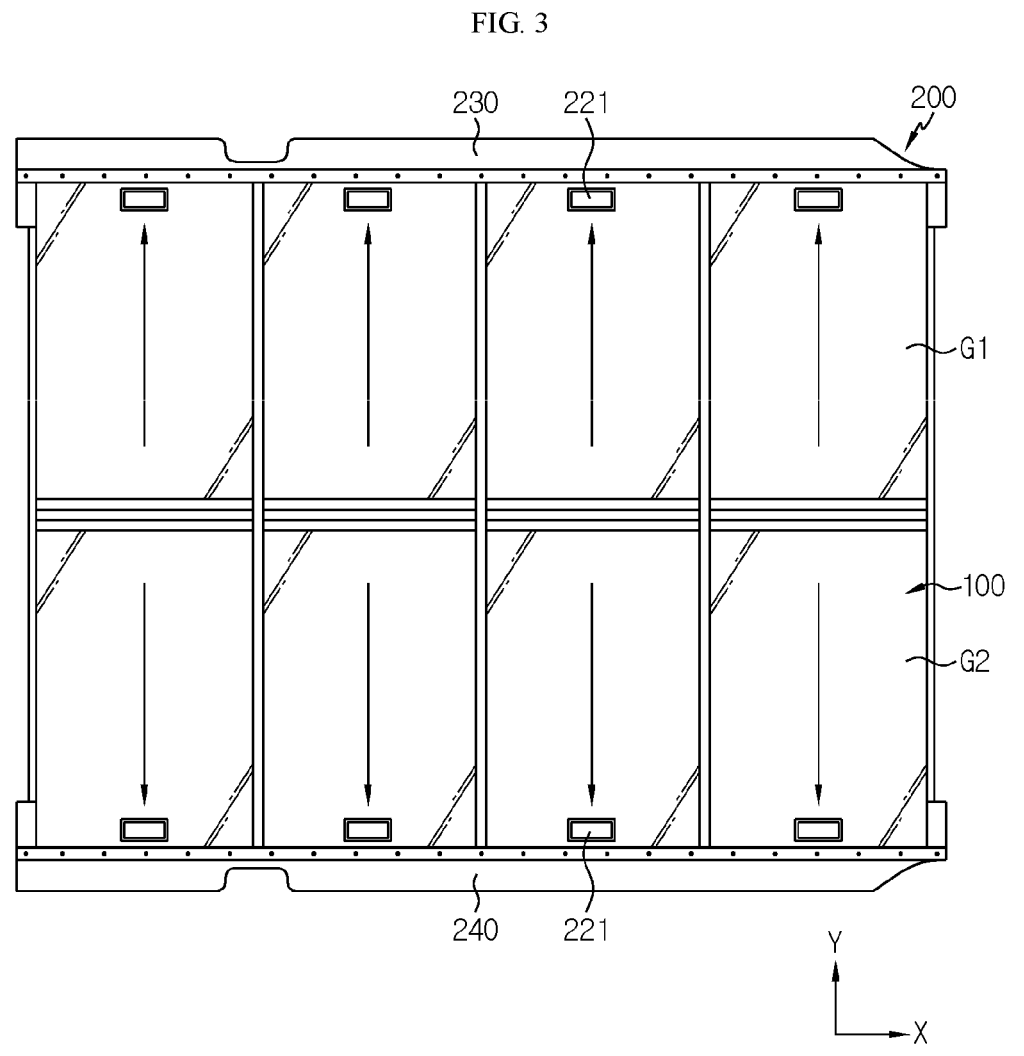

FIG. 1 is a schematic perspective view of a battery pack according to an embodiment of the present disclosure, FIG. 2 is a partial exploded perspective view of the battery pack of FIG. 1, and FIG. 3 is a conceptual diagram of a gas venting path of the battery pack of FIG. 1.

As shown in FIGS. 1 and 2, the battery pack 10 according to an embodiment of the present disclosure includes a plurality of battery modules 100, and a pack case 200 accommodating the plurality of battery modules 100, wherein a gas venting channel 150 of each battery module 100 is connected to a venting port 221 of a top plate 220 of the pack case 200 for gas venting when gas is generated from each battery module 100.

As described below in detail, when gas is generated from each battery module 100, the battery pack 10 of the present disclosure may allow venting gas to move to the edge of the battery module 100 and exit the pack case 200 through the venting port 221 of the pack case 200 on each battery module 100 as shown in FIG. 3. The venting port 221 includes a rupturable membrane 223 that may rupture under a predetermined pressure or above, and the rupturable membrane 223 may be closed in normal condition, and when venting gas occurs, may be torn open by the pressure.

When gas is generated from any battery module 100, the battery pack 10 according to the present disclosure may allow venting gas to exit the pack case 200 directly from the corresponding battery module 100, thereby preventing the spread of heat or high temperature spark to the other battery module 100 in the pack case 200. Accordingly, the battery pack 10 of the present disclosure may prevent thermal runaway propagation to the other battery modules 100 in the event of high temperature venting gas in any battery module 100.

Hereinafter, the battery module 100 and the pack case 200 according to an embodiment of the present disclosure for achieving the above-described effect will be described in detail.

Figure 4:
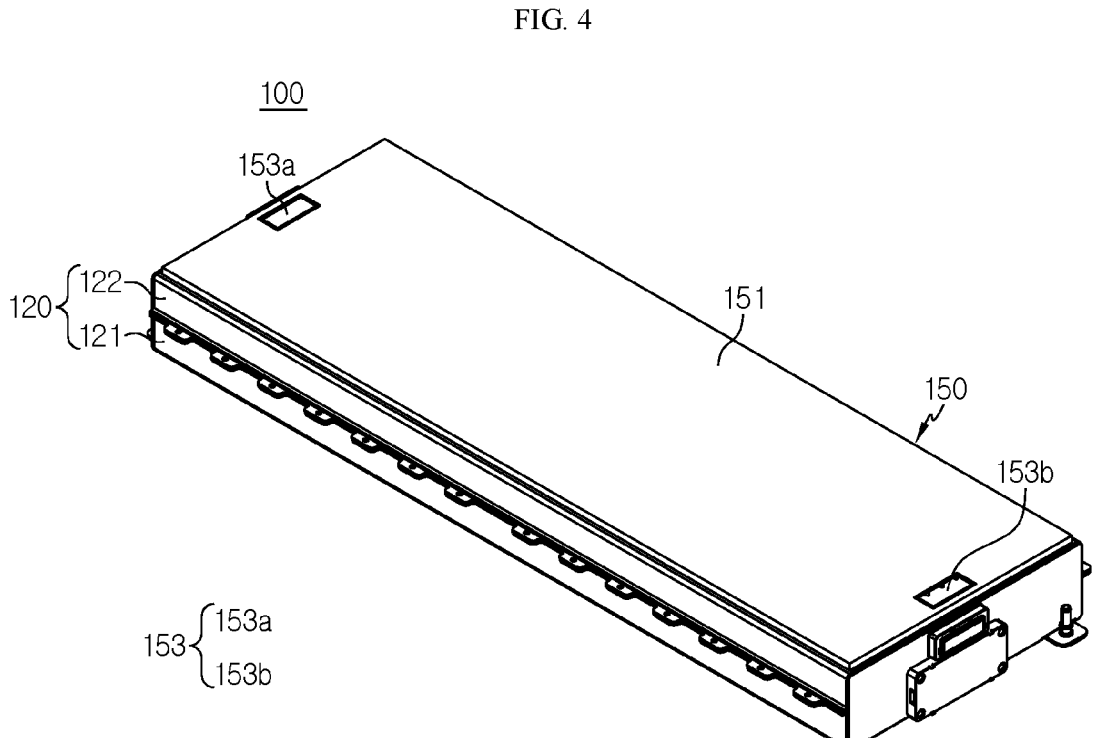
FIG. 4 is a perspective view of a battery module according to an embodiment of the present disclosure.
Figure 5:
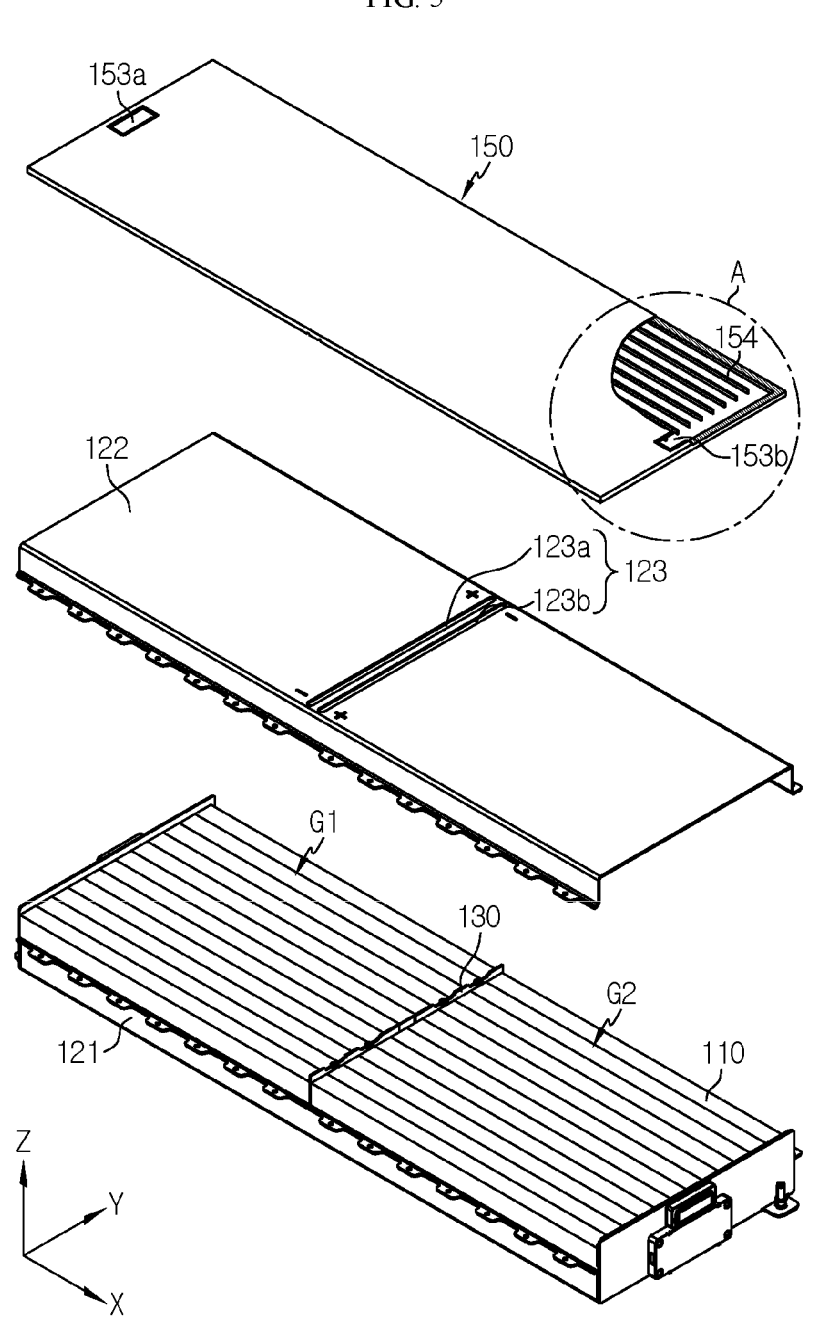
FIG. 5 is an exploded perspective view of the main parts of the battery module of FIG. 4.
Figure 6:
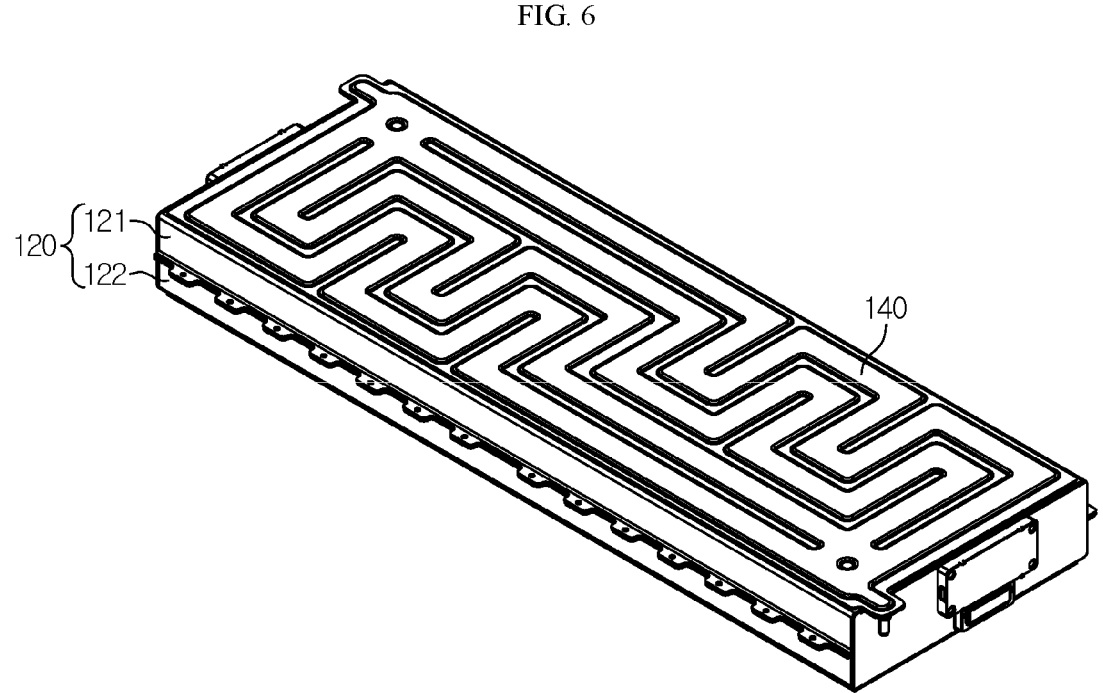
FIG. 6 is a diagram showing the bottom of the battery module of FIG. 4.
Figure 7:
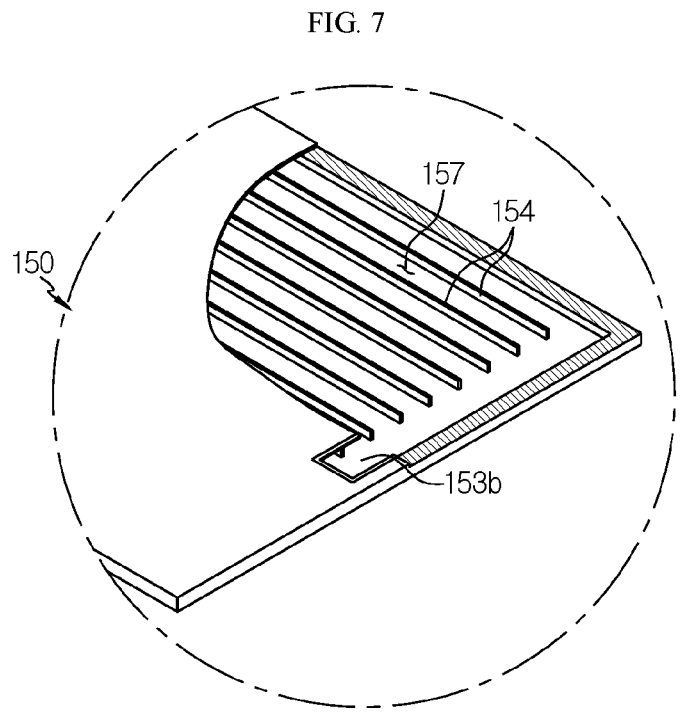
FIG. 7 is an enlarged diagram of section A in FIG. 5.

FIG. 4 is a perspective view of the battery module 100 according to an embodiment of the present disclosure, FIG. 5 is an exploded perspective view of the main parts of the battery module 100 of FIG. 4, FIG. 6 is a diagram showing the bottom of the battery module 100 of FIG. 4, and FIG. 7 is an enlarged diagram of section A in FIG. 5.

To begin with, the battery module 100 according to an embodiment of the present disclosure will be described with reference to FIGS. 4 to 7. The battery module 100 includes a plurality of battery cells 110, a module housing 120, a firewall 130, a heat sink 140 and the gas venting channel 150.

The battery cell 110 may include a pouch-type battery cell 110 that has high energy density and is easy to stack. As shown in FIG. 5, the pouch-type battery cells 110 may be stacked in the horizontal direction (Y axis direction) upright in the vertical direction (Z axis direction) to form a cell stack. As opposed to this embodiment, the battery module 100 may include prismatic battery cells 110 of a rectangular prism shape or cylindrical battery cells 110.

The module housing 120 is a component used to receive the plurality of battery cells 110, and may be formed with a hermetic structure using a material having high mechanical strength to protect the plurality of battery cells 110 from external physical and chemical factors. The module housing 120 may include a lower housing 121 to cover the lower parts of the battery cells 110 and an upper housing 122 to cover the upper parts of the battery cells 110. The upper housing 122 and the lower housing 121 may be in the shape of an approximately U-shaped plate, and they may be coupled to each other by bolting and/or welding.

In general, the conventional battery module 100 includes one cell stack received in one module housing 120. However, the battery module 100 of this embodiment includes a plurality of cell stacks received in one module housing 120.

For example, as shown in FIG. 5, the battery module 100 of this embodiment includes first group battery cells G1 that form a cell stack and second group battery cells G2 that form another cell stack, and the first group battery cells G1 and the second group battery cells G2 may be received in the module housing 120 such that they are disposed face each other with the firewall 130 interposed therebetween, wherein the firewall 130 divides the internal space of the module housing 120 into two.

That is, the first group battery cells G1 are positioned in one space of the lower housing 121 partitioned by the firewall 130 and the second group battery cells G2 are positioned in the other space of the lower housing 121. Each of the upper parts of the first group battery cells G1 and the second group battery cells G2 positioned as described above may be received in each of the two hermetic spaces surrounded by the upper housing 122, the lower housing 121 and the firewall 130, with the upper parts covered with the upper housing 122.

Here, the firewall 130 refers to a plate-shaped structure that partitions the internal space of the module housing 120 into two physically separated spaces. The firewall 130 may be made of, for example, a fire-resistant material or a stiff material, and may have a sheet of fire-resistant material (for example, mica) attached to two surfaces. The firewall 130 may block heat transfer between the first group battery cells G1 and the second group battery cells G2, and prevent the module housing 120 from sagging in the middle due to the top and bottom connected to the center of the upper housing 122 and the lower housing 121, respectively.

Although not shown, for example, the upper housing 122 may have an opening that is open at a part of the central side area. The opening may be used to install a connection means for electrically connecting the first group battery cells G1 to the second group battery cells G2. The connection means may include a metal rod-shaped busbar, and after the connection means is installed, the opening may be sealed up.

One battery module 100 according to this embodiment may have, for example, the capacity equivalent to two battery modules 100, each including one cell stack received in one module housing 120, but may reduce the volume. Accordingly, the battery modules 100 may be advantageous in reducing the left-right width (X axis direction) of the pack case 200 when fabricating the battery pack 10.

The heat sink 140 may be provided at the bottom of the module housing 120, in other words, on the lower surface of the lower housing 121 as shown in FIG. 6. Here, the heat sink 140 refers to a cooling component that absorbs heat by indirect contact with the battery cells 110. The heat sink 140 may have an aluminum plate shape with an internal flow channel, and as shown in this embodiment, may be incorporated into the lower housing 121 or may be detachably attached to the surface of the lower housing 121.

The gas venting channel 150 is used to allow venting gas inside the battery module 100 out, and one side may be in communication with the inside of the module housing 120 and the other side may be in communication with the outdoor environment. The gas venting channel 150 may be attached to the outer side of the module housing 120 or may be integrally formed with the module housing 120.

The gas venting channel 150 of this embodiment may have a hollow flat rectangular box shape with a size approximately corresponding to the upper surface of the upper housing 122, and may be attached onto the module housing 120. Additionally, the gas venting channel 150 may be made of a fire-resistant material to prevent deformation caused by high temperature gas or high temperature spark.

Specifically, referring to FIGS. 5 and 7 to 9, the gas venting channel 150 includes a duct 151 of a hollow structure, a gas inlet 152 that corresponds to a hole through which gas enters the duct 151, and a gas outlet 153 that corresponds to a hole through which gas exits the duct 151.

The duct 151 has an area corresponding to the upper surface of the module housing 120 and is hollow to allow gas to flow inside. Additionally, the duct 151 may include a plurality of partitions 154 to partition the internal space, and the partitions 154 may be spaced apart from each other in the widthwise direction and extended in the lengthwise direction.

For example, as shown in FIG. 7, the duct 151 is partitioned by the partitions 154 to form narrow passages 157 between the partitions 154. The high temperature spark or flame moving together with the venting gas may be restrained from moving or extinguished due to bottlenecking or trapping while moving in the narrow passages. As an additional solution to suppress the movement of the high temperature spark or flame, a metal mesh (not shown) may be additionally applied to the narrow passages or the gas inlet 152.

The gas inlet 152 may be provided on the lower surface of the duct 151 and match a first opening 123 on top of the module housing 120.

Figure 8:
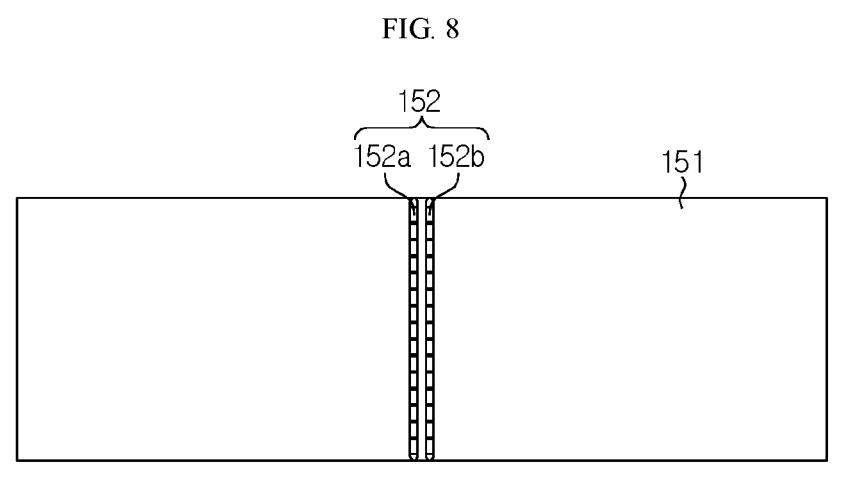

More specifically, as shown in FIG. 8, the gas inlet 152 may have a long hole shape that is as large as the width of the module housing 120 in the central area of the lower surface of the duct 151. The gas inlet 152 may include a first gas inlet 152a and a second gas inlet 152b, and the first gas inlet 152a and the second gas inlet 152b may be symmetric with respect to the center of the module housing 120.

Figure 10:
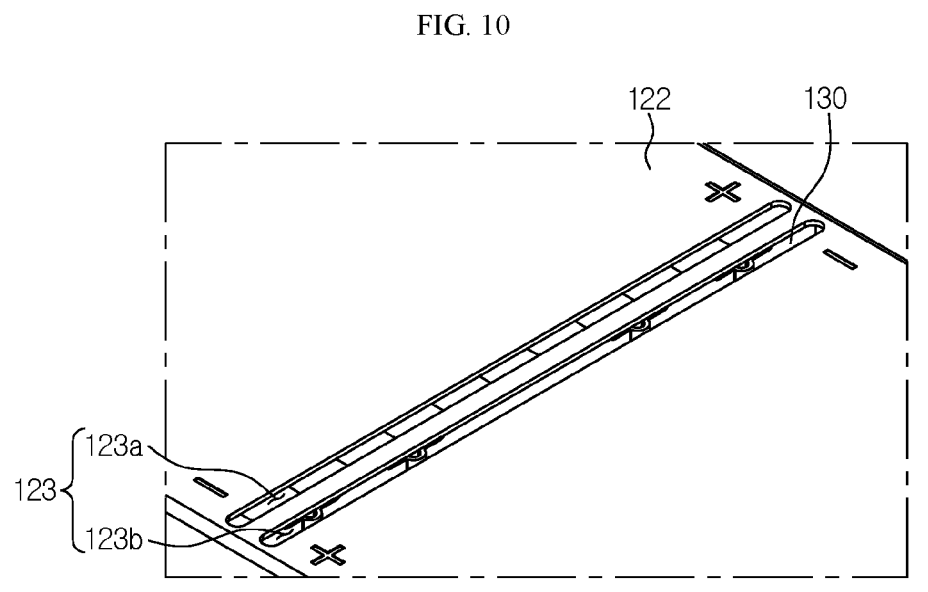
Figure 11:
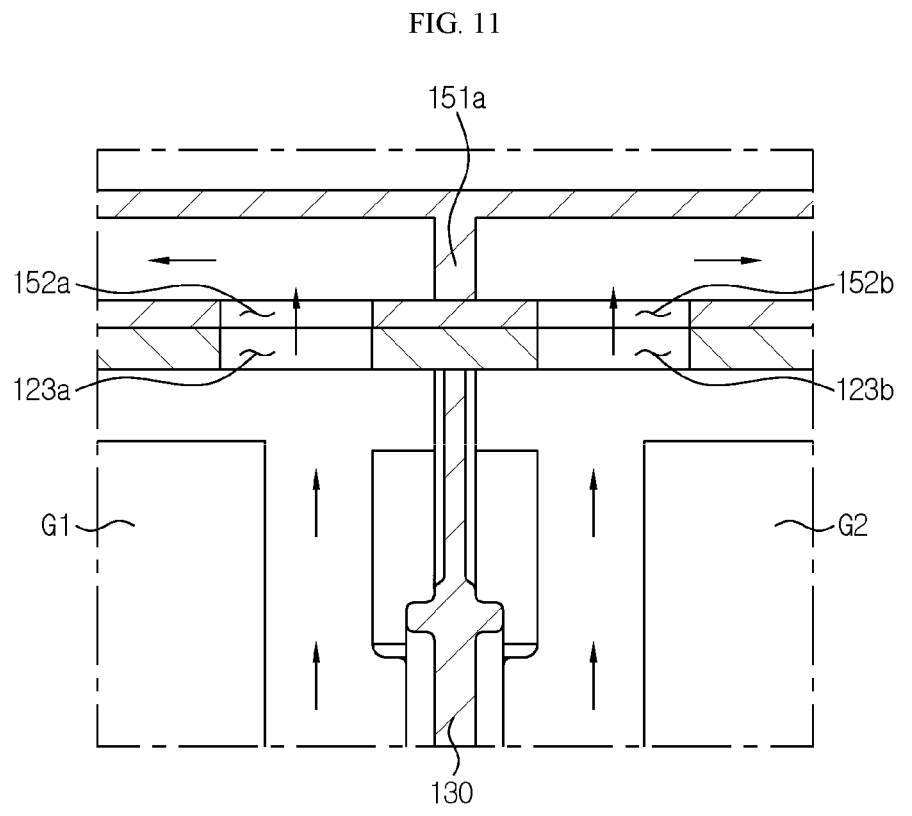

Additionally, as shown in FIGS. 10 and 11, the first opening 123 of the module housing 120 includes a 1_1 opening 123a on the left top side of the module housing 120 and a 1_2 opening on the right top side of the module housing 120 with respect to the firewall 130. When the gas venting channel 150 is attached to the upper surface of the module housing 120, the 1_1 opening may vertically match the first gas inlet 152a and the 1_2 opening may vertically match the second gas inlet 152b.

Accordingly, gas and high temperature spark generated from the first group battery cells G1 may enter the duct 151 through the 1_1 opening 123a and the first gas inlet 152a, and gas and high temperature spark generated from the second group battery cells G2 may enter the duct 151 through the 1_2 opening 123b and the second gas inlet 152b.

Additionally, as shown in FIG. 11, a barrier 151a in the internal space of the duct 151 between the first gas inlet 152a and the second gas inlet 152b may prevent gas generated from the first group battery cells G1 from moving to the second group battery cells G2.

Although not shown, the first opening 123 may be closed with a cap (not shown) made of a hot melt material (for example, rubber or plastic). The cap may prevent impurities from entering the module housing 120 through the first opening 123 in normal condition. When venting gas or high temperature spark occurs, the cap is melted down by heat and pressure to open the first opening 123. The cap may be replaced with a mesh.

The gas outlet 153 may be provided on the upper surface of the duct 151. The gas outlet 153 may include a first gas outlet 153a and a second gas outlet 153b. The gas outlet 153 may vertically match the venting port 221 of the top plate 220.

The first gas outlet 153a may be provided at a predetermined distance from the first gas inlet 152a in the left extension direction (−X axis direction) of the duct 151, and the second gas outlet 153b may be provided at a predetermined distance from the second gas inlet 152b in the right extension direction (+X axis direction) of the duct 151.

Figure 9:
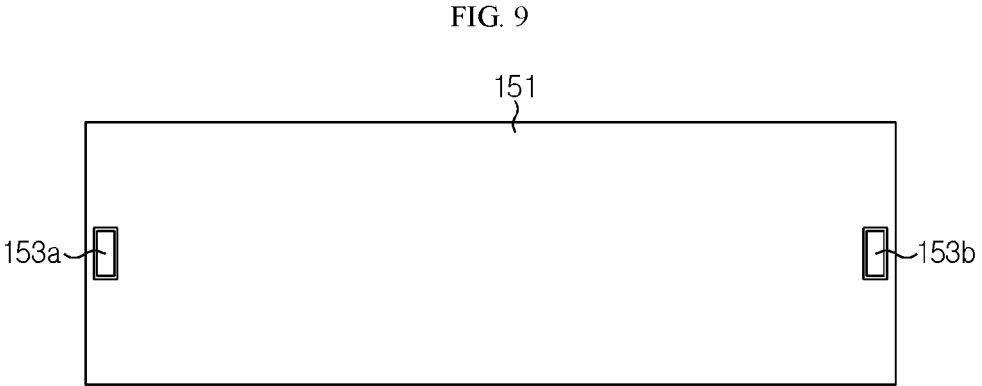
FIG. 9 is a plan view of a gas venting channel of FIG. 5.
Figure 12:
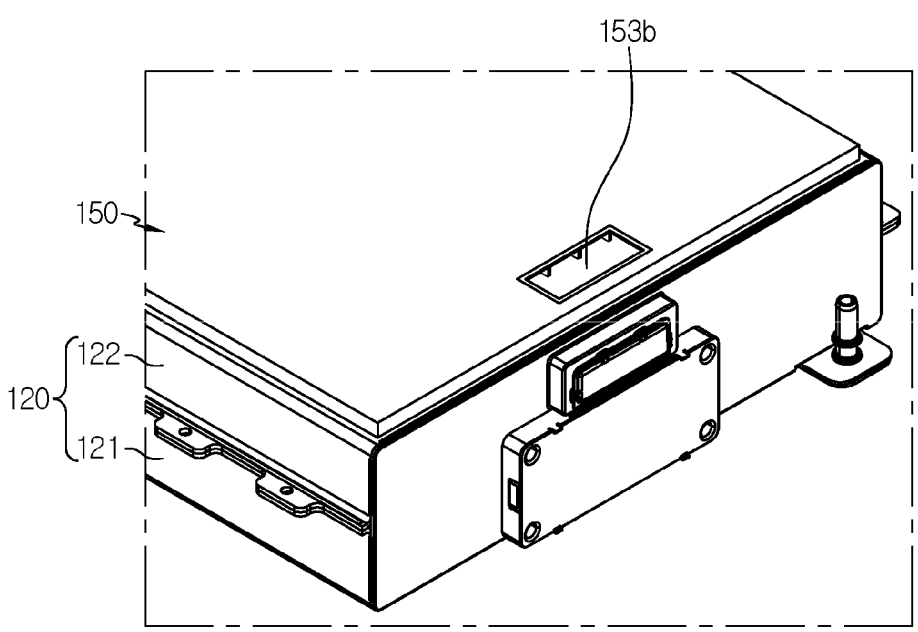
FIG. 12 is a diagram showing an edge area of a battery module according to an embodiment of the present disclosure.

That is, referring to FIGS. 9 and 12, the first gas outlet 153a acts as an exit of venting gas entering the duct 151 through the first gas inlet 152a, and the second gas outlet 153b acts as an exit of venting gas entering the duct 15 through the second gas inlet 152b.

The first gas outlet 153a and the second gas outlet 153b may be each formed in a hole shape of sufficient size to vertically match the venting port 221, and may be provided at the left edge area and the right edge area of the upper surface of the duct 151, respectively.

The pack case 200 is a component used to receive the battery modules 100, and as shown in FIG. 2, may include a base plate 210, the top plate 220, a left side frame 230, a right side frame 240, a front cover 250 and a rear cover 260.

In particular, the top plate 220 is configured to cover the upper parts of the battery modules 100, and includes a plurality of venting ports 221 through which venting gas exits.

Figure 13:
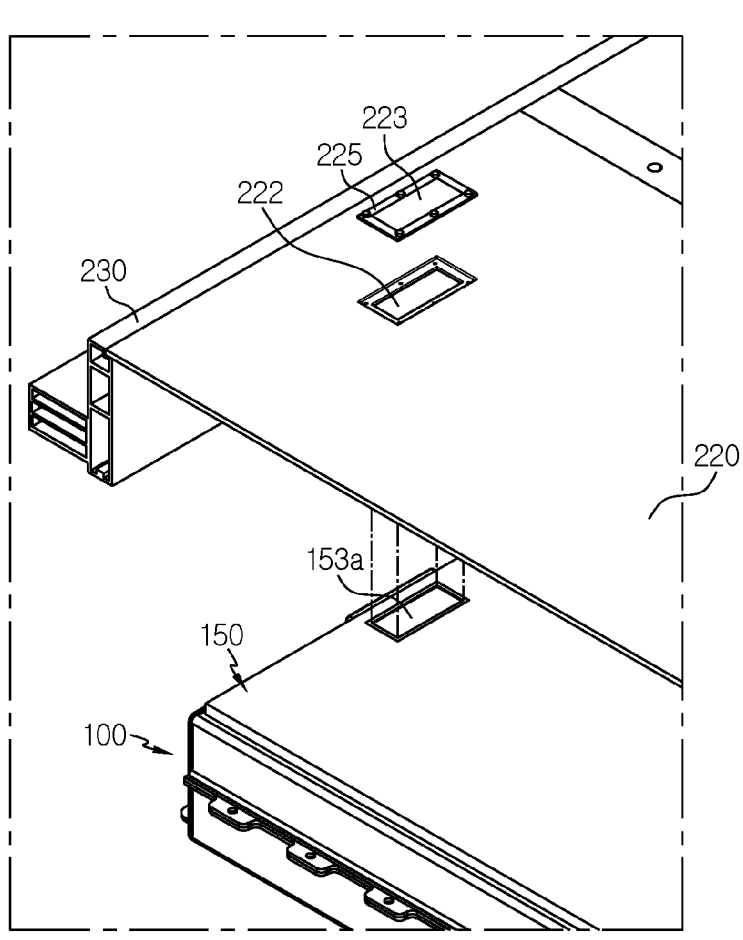
FIGS. 13 and 14 are diagrams illustrating a communication structure between a gas venting channel and a top plate according to an embodiment of the present disclosure.
Figure 14:
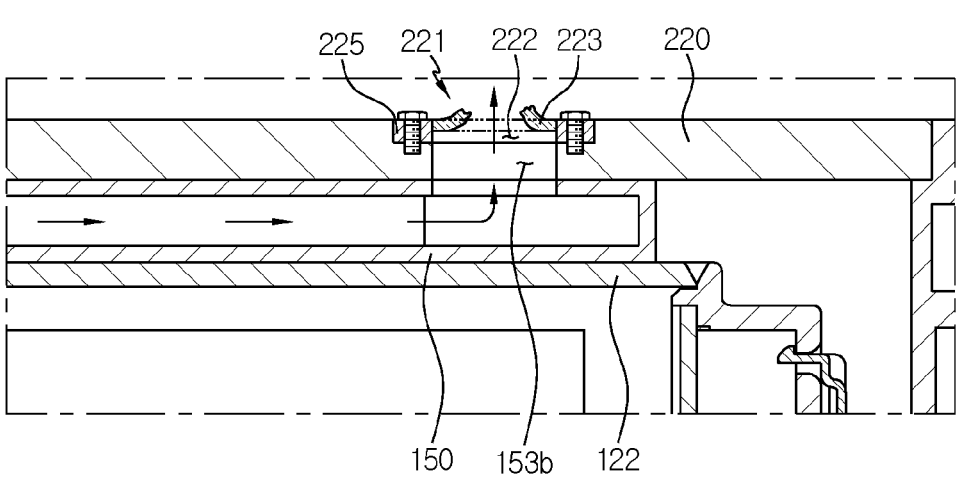

As shown in FIGS. 13 and 14, the venting port 221 may be at a location vertically corresponding to the first gas outlet 153a or the second gas outlet 153b of each battery module 100 when the battery modules 100 are covered with the top plate 220. For example, in this embodiment, the battery modules 100 are arranged along the lengthwise direction (Y axis direction) of the pack case 200 with the first gas outlet 153a and the second gas outlet 153b of each battery module 100 at the two edges in the widthwise direction of the pack case 200. Half of the venting ports 221 is provided at the left edge area of the top plate 220 and the remaining half is provided at the right edge area of the top plate 220, so the gas outlets 153 of all the battery modules 100 and the venting ports 221 vertically match and are connected in a one-to-one relationship.

The arrangement structure of the battery modules 100 received in the pack case 200 or the positions of the first gas outlet 153a and the second gas outlet 153b of the battery module 100 may be properly changed as necessary differently from this embodiment. In this case, the venting ports 221 may be positioned in the top plate 220 to match the changed positions of the first gas outlet 153a and the second gas outlet 153b.

The venting port 221 of this embodiment includes a through-hole 222 and the rupturable membrane 223.

The through-hole 222 may have a size that is equal to or larger than the gas outlet 153 to prevent the leakage of venting gas, and a sealing member (not shown) such as an O-ring) may be applied around the through-hole 222.

The rupturable membrane 223 may be configured to cover the through-hole 222 and rupture when the internal pressure of the pack case 200 exceeds the predetermined pressure. According to this configuration, it is possible to prevent the infiltration of moisture or impurities into the pack case 200 in normal condition, and when venting gas occurs, the rupturable membrane 223 ruptures by the heat and pressure of the venting gas to open the through-hole 222 to allow the venting gas to flow out of the pack case 200. In this instance, it is possible to allow the venting gas out through the through-hole quickly without leakage due to a large pressure difference between the inside and outside of the pack case 200.

The rupturable membrane 223 may be in the form of an aluminum or plastic thin film, but is not limited thereto, and may be made of any material that can rupture by the predetermined pressure. Additionally, the rupturable membrane 223 may include at least one notch (not shown) that is partially cut in the thicknesswise direction from the surface. The notch may help the rupturable membrane 223 to easily rupture when the predetermined pressure is applied.

In this embodiment, a support frame 225 of a frame shape may be used to easily mount the rupturable membrane 223 in the through-hole 222.

The support frame 225 may support the periphery of the rupturable membrane 223, and the through-hole 222 may be covered with the rupturable membrane 223 by mounting the support frame 225 in the top plate 220 by bolting or riveting. In this case, compared to when the rupturable membrane 223 is directly mounted in the top plate 220, it is easier to assemble and sealability may be improved.

Additionally, the top plate 220 according to this embodiment may further include a partition extended across the top plate 220 in the widthwise direction and running down from the surface to form a wall. The top plate 220 may include a plurality of partitions arranged at a predetermined interval along the lengthwise direction (Y axis direction) of the top plate 220. The partitions may prevent the deformation of the top plate 220, and block the heat transfer between the adjacent battery modules 100 when a fire occurs as they are disposed in a space between the battery modules 100 when the battery modules 100 are covered with the top plate 220.

By the configuration of the battery pack 10 according to an embodiment of the present disclosure, when venting gas occurs in the battery module 100, the venting gas may exit in the following flow.

Venting gas occurs in each battery module 100→the gas exits the module housing 120 through the 1_1 opening 123a or the 1_2 opening 123b on top of the module housing 120→the gas enters the gas venting channel 150 through the first gas inlet 152a or the second gas inlet 152b of the venting gas channel→the venting gas moves to the first gas outlet 153a or the second gas outlet 153b at the two edges of the battery module 100 along the duct 151→the rupturable membrane 223 of the venting port 221 ruptures to open the venting port 221→the venting gas exits the pack case 200 through the open venting port 221.

Accordingly, as described above, since the battery pack 10 according to an embodiment of the present disclosure is configured to allow venting gas to exit the pack case 200 directly from each battery module 100 without moving in the pack case 200, when venting gas occurs due to a failure in any battery module 100, the venting gas does not cause thermal damage to the other battery modules 100. Accordingly, when a fire occurs in one battery module 100, the present disclosure may prevent thermal runaway that causes the fire to spread due to the transfer of venting gas or high temperature spark to the other battery module 100. Additionally, the battery pack 10 of the present disclosure may intuitively detect the battery module 100 at which the fire occurred from the location at which venting gas comes out, which makes it possible to accurately and effectively take an action, for example, concentratively supplying fire-fighting water to the corresponding battery module 100.

Subsequently, a variation of the top plate 220 and another embodiment of the present disclosure will be described with reference to FIGS. 15 and 16.

Figure 15:
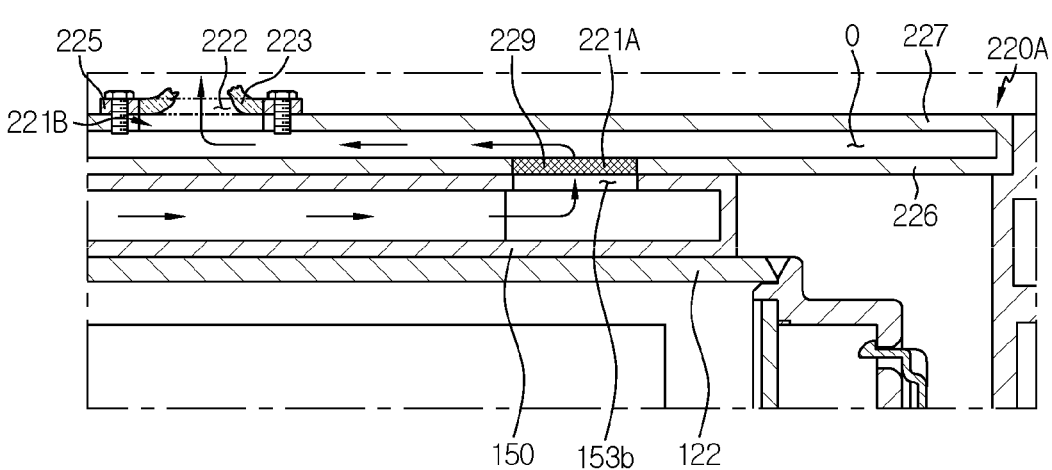
FIG. 15 is a diagram showing a variation of the top plate of FIG. 14.

To begin with, referring to FIG. 15, the top plate 220A according to the variation has a hollow structure, and includes a lower plate 226 facing the upper surface of the gas venting channel 150, and an upper plate 227 opposite to the lower plate with an empty space O therebetween.

Additionally, the venting port includes a first venting port 221A in the lower plate 226, and a second venting port 221B in the upper plate 227 at a predetermined distance apart from the first venting port 221A in the horizontal direction, wherein the first venting port 221A matches and is vertically connected to the gas outlet 153 of the gas venting channel 150. The rupturable membrane 223 may be provided in the first venting port 221A, and instead of the rupturable membrane 223, a mesh 229 may be provided in the second venting port 221B. On the contrary, the mesh 229 may be provided in the first venting port 221A, and the rupturable membrane 223 may be provided in the second venting port 221B.

When compared with the top plate 220 described above, the top plate 220A according to this variation may be advantageous in reducing the venting gas pressure due to its more complicated gas venting path. Additionally, the complicated venting path and the configuration of the first venting port 221A and the second venting port 221B makes it more difficult for high temperature spark or flame to exit the pack case 200 together when allowing the venting gas out. Accordingly, this variation may be more advantageous than the above-described embodiment in preventing fire risks near the outside of the battery pack 10.

Subsequently, a battery pack according to another embodiment of the present disclosure will be described with reference to FIG. 16. The same reference numeral as the previous embodiment indicates the same element. To avoid redundancy, the overlapping description of the same element is omitted and the following description is made based on difference(s) between this embodiment and the previous embodiment.

Figure 16:
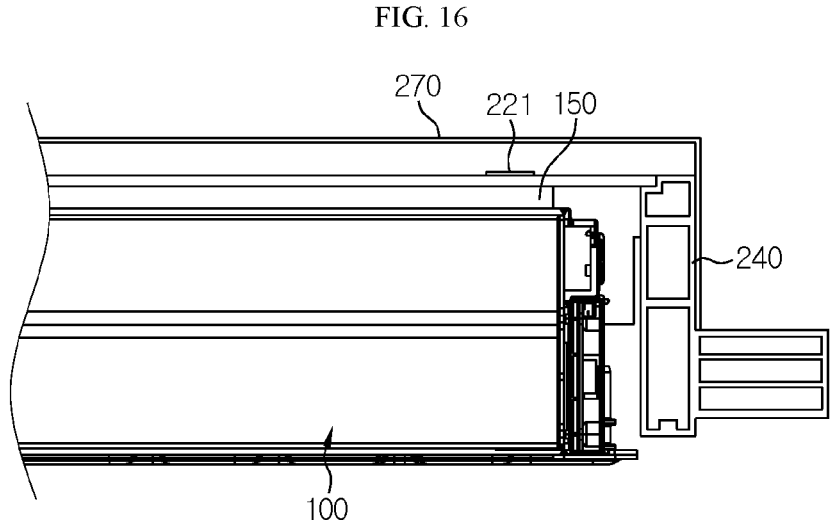
FIG. 16 is a diagram showing an example of an outer cover plate added to prevent the exposure of a top plate according to another embodiment of the present disclosure.

When compared with the previous embodiment, the battery pack according to another embodiment of the present disclosure may further include an outer cover plate 270 configured to surround the upper area of the top plate 220 as shown in FIG. 16.

The battery pack 10 of the previous embodiment may have the risk of damage caused by external forces since the rupturable membrane 223 on the top plate 220 is directly exposed to the external environment. Accordingly, the battery pack according to another embodiment of the present disclosure is configured to cover the rupturable membrane 223 with the outer cover plate 270 to protect the rupturable membrane 223 from external forces. The outer cover plate 270 may be, for example, a high strength plastic, aluminum or iron plate, and may have an air permeable structure such as, for example, a grating, to allow air to pass therethrough, where necessary.

The battery pack according to the present disclosure may be applied to a vehicle such as an electric vehicle or a hybrid electric vehicle. That is, the vehicle according to the present disclosure may include the battery pack according to the present disclosure. The battery pack may be installed in the vehicle body frame below the vehicle seat or the trunk space, and the battery pack may be installed in the vehicle with the top plate of the pack case flipped upside down where necessary.

Meanwhile, the terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the appended claims and equivalents thereof.

What is claimed is:

1. A battery pack, comprising:
a plurality of battery modules, each of the plurality of battery modules including battery cells and a module housing accommodating the battery cells;
a pack case accommodating the plurality of battery modules, the pack case including a top plate to cover upper parts of the plurality of battery modules, the top plate having at least one venting port,
wherein each module housing includes a gas venting channel, each gas venting channel including:
a duct of a hollow structure;
at least one gas inlet provided on a first side of the duct; and
a gas outlet provided on a second side of the duct at a predetermined distance from the gas inlet in an extension direction of the duct,
wherein the gas venting channel is in communication with the at least one venting port, and
wherein the at least one gas inlet aligns with a first opening of each module housing, and the gas outlet aligns with the at least one venting port of the top plate.

2. The battery pack according to claim 1, wherein the at least one venting port includes a rupturable membrane which ruptures at a predetermined pressure or above.

3. The battery pack according to claim 1, wherein the at least one gas inlet is a plurality of gas inlets, and the at least one venting port is vertically connected to the gas outlet of the gas venting channel.

4. The battery pack according to claim 1, wherein the top plate is formed in a hollow structure, wherein the top plate includes:

a lower plate facing an upper surface of the gas venting channel; and an upper plate opposite to the lower plate with an empty space therebetween, and wherein the at least one venting port includes a first venting port in the lower plate, the first venting port vertically connected to the gas outlet of the gas venting channel; and a second venting port in the upper plate at a predetermined distance apart from the first venting port in a horizontal direction.

5. The battery pack according to claim 4, wherein a rupturable membrane is provided in a first of the first venting port and the second venting port, and a mesh is provided in a second of the first venting port and the second venting port.

6. The battery pack according to claim 1, further comprising:

an outer cover plate configured to surround an upper area of the top plate.

7. The battery pack according to claim 1, wherein the duct includes a plurality of partitions to partition an internal space.

8. The battery pack according to claim 7, wherein the duct includes a plurality of passages extended in a lengthwise direction between the plurality of partitions.

9. The battery pack according to claim 1, wherein the battery cells include first group battery cells and second group battery cells that are disposed to face each other with a firewall interposed therebetween configured to partition an internal space of the module housing.

10. The battery pack according to claim 9, wherein the first opening includes a first first opening on a left top side of the module housing and a second first opening on a right top side of the module housing with respect to the firewall, and wherein the at least one gas inlet includes a first gas inlet which matches the first first opening and a second gas inlet which matches the second first opening.

11. The battery pack according to claim 9, wherein the gas outlet includes a first gas outlet in a left edge area of the duct and a second gas outlet in a right edge area of the duct.

12. The battery pack according to claim 9, wherein the first opening is closed with a cap made of a hot melt material.

13. The battery pack according to claim 1, wherein the module housing and the gas venting channel are integrally formed.

14. A vehicle comprising the battery pack according to claim 1.

15. The battery pack according to claim 1, wherein each gas venting channel has a barrier dividing the gas venting channel into two parts, each part of the gas venting channel having the gas inlet and the gas outlet.

16. The battery pack according to claim 15, wherein the top plate has an interior empty space between an upper plate and a lower plate, and wherein the at least one venting port comprises a first venting port in communication with each of the gas outlets of the gas venting channel and a second venting port in the upper plate.

17. The battery pack according to claim 16, further comprising a mesh in each of the first venting ports.

* * * * *